J. C. HINZ.
DRILL GRINDER.
APPLICATION FILED JULY 4, 1919.

1,388,039.

Patented Aug. 16, 1921.
5 SHEETS—SHEET 1.

INVENTOR
JULIUS C. HINZ,
BY
ATTORNEY

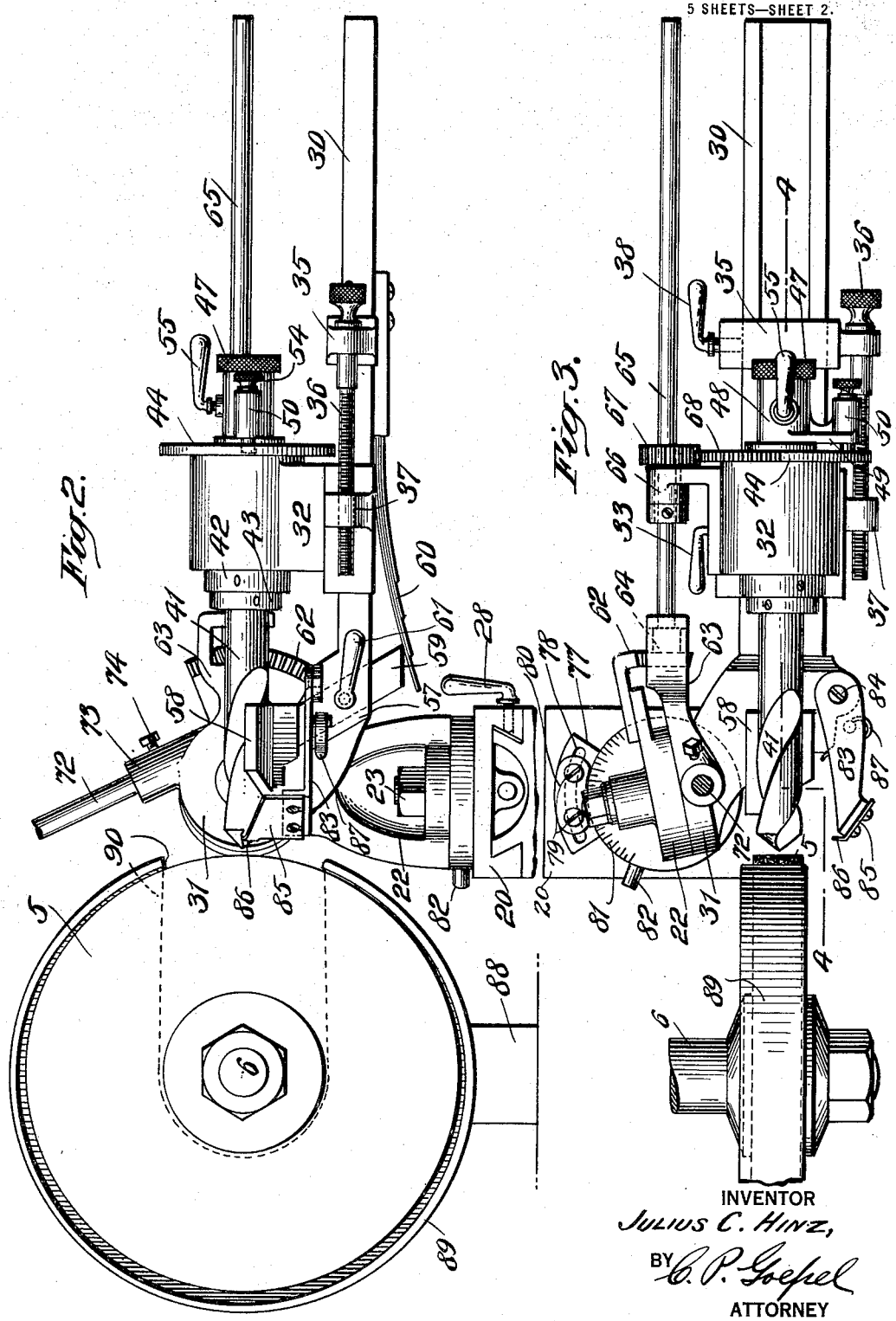

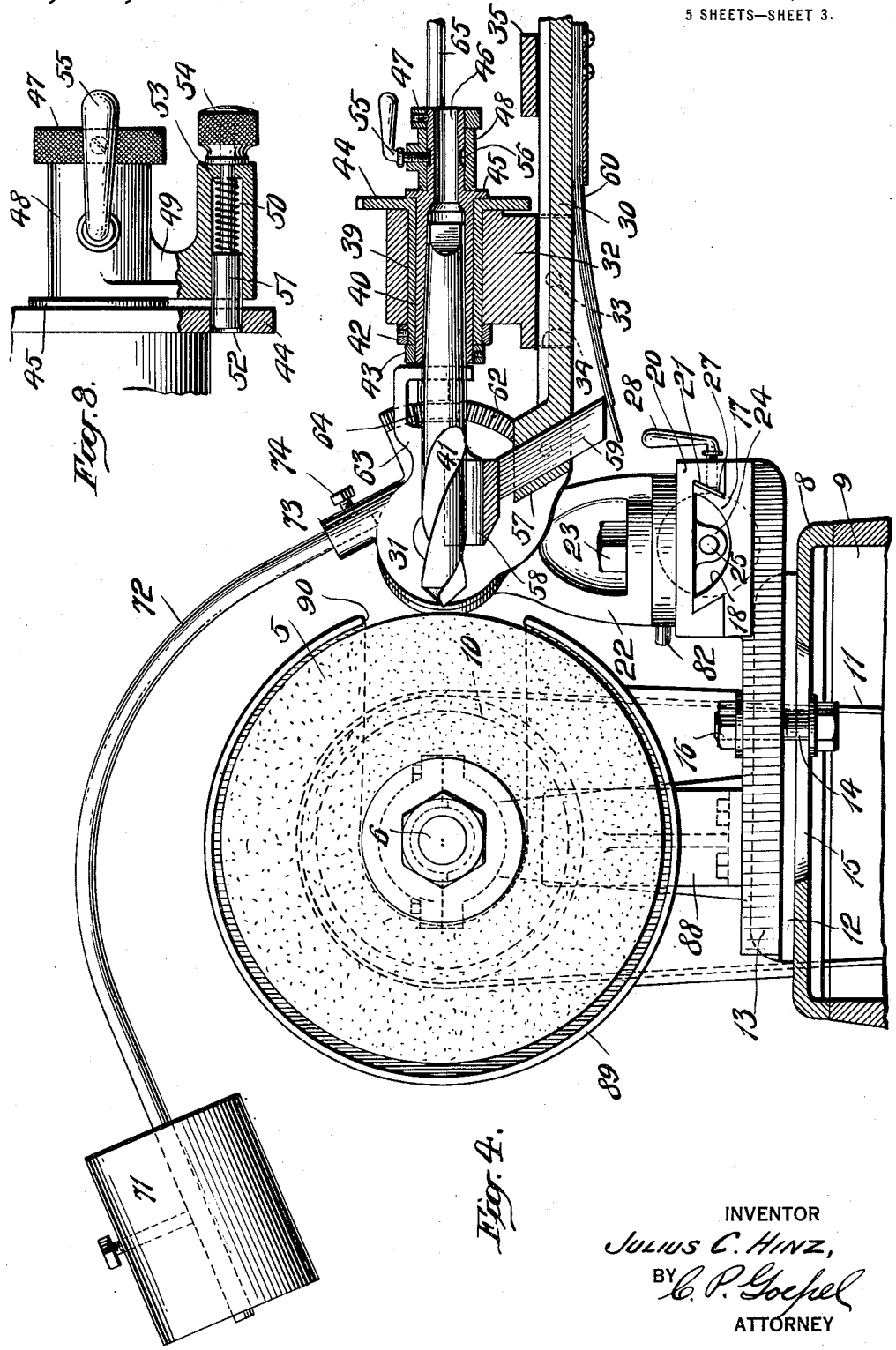

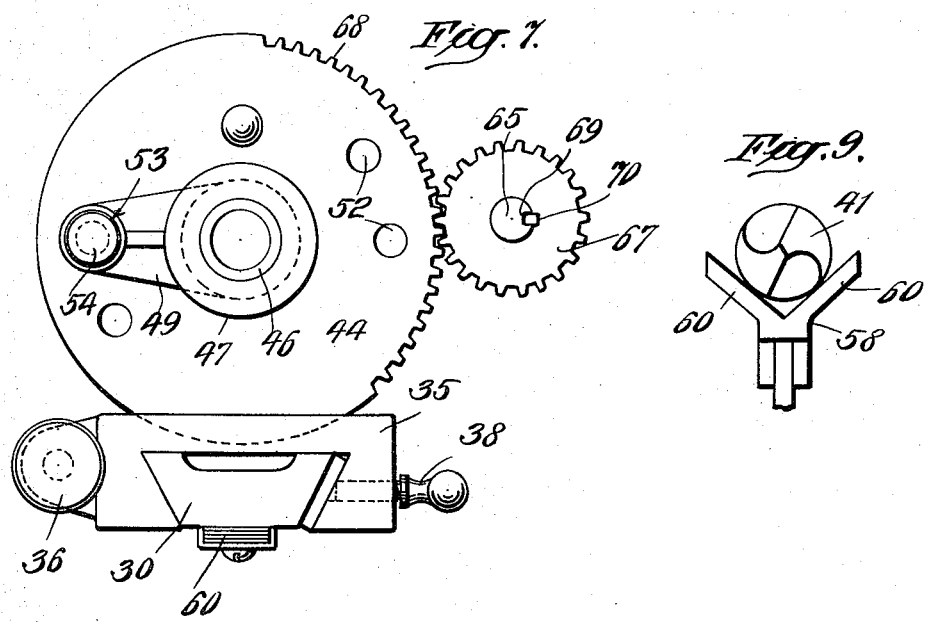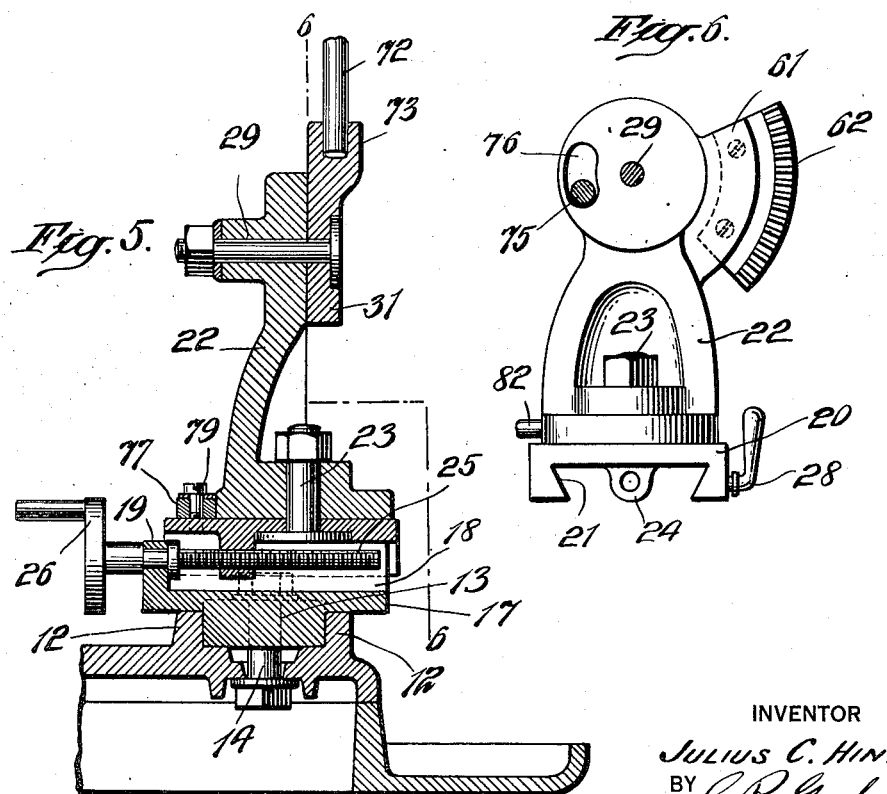

J. C. HINZ.
DRILL GRINDER.
APPLICATION FILED JULY 4, 1919.
1,388,039.
Patented Aug. 16, 1921.
5 SHEETS—SHEET 5.
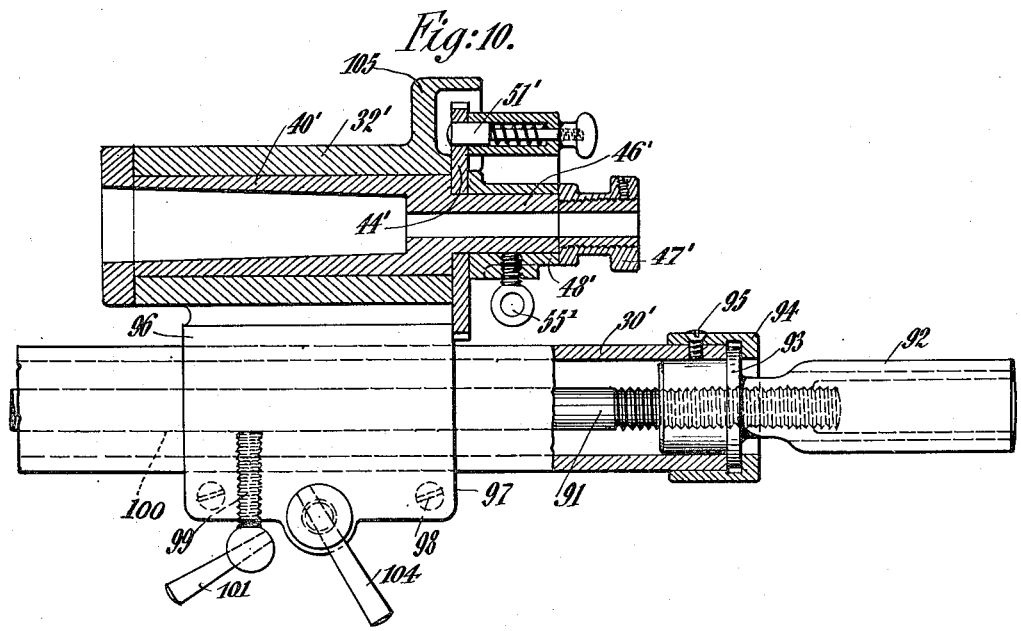
Fig:10.
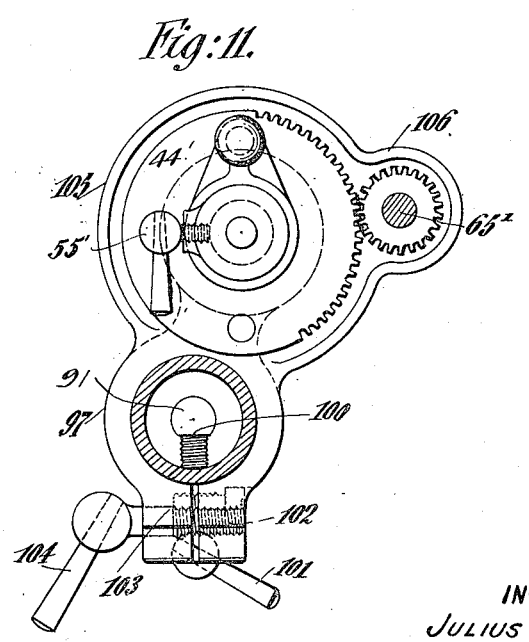
Fig:11.
INVENTOR
JULIUS C. HINZ,
BY C. P. Goepel
ATTORNEY

UNITED STATES PATENT OFFICE.

JULIUS C. HINZ, OF DETROIT, MICHIGAN; WILLIAM HINZ, ADMINISTRATOR OF SAID JULIUS C. HINZ, DECEASED.

DRILL-GRINDER.

1,388,039.  Specification of Letters Patent.  Patented Aug. 16, 1921.

Application filed July 4, 1919. Serial No. 308,684.

*To all whom it may concern:*

Be it known that I, JULIUS C. HINZ, a citizen of the United States, and a resident of Detroit, in the county of Wayne and State of Michigan, having invented certain new and useful Improvements in Drill-Grinders, do hereby declare that the following is a full, clear, and exact description of the same.

This invention relates to drill grinders and has for its primary object to provide an improved machine for quickly and accurately grinding or sharpening twist drills.

More particularly, the present invention comprehends the provision of improved means for mounting the drill carriage or support whereby the drill may be vertically oscillated relative to the grinding member, and means for simultaneously imparting an oscillatory rotary movement to the drill about its own axis.

My present improvements further contemplate the provision of an improved gage for limiting the adjustment of the drill and properly positioning the drill lip relative to the grinding face of the wheel; means for successively positioning the lips of a multiple lip drill in position to be ground and means for varying the angle to which the drill lip is ground.

It is also my purpose to provide in a drill or tool grinder a slide mounted upon the bedplate for movement relative to the grinding wheel and upon which the drill carriage and the support whereon it is mounted and oscillated may be adjusted in a line parallel to the axis of the wheel to dispose the drill point in a desired position with respect to the peripheral surface of the wheel, said slide and the parts carried thereby being adapted for adjustment to compensate for wear of the wheel, and a wheel guard carried by the slide and movable therewith so that the exposed peripheral surface portion of the wheel and the guard will at all times be maintained in a constant position relative to each other.

It is also a general object of my invention to provide a machine for the above purpose which is relatively simple in its construction, not liable to get out of order and which may be operated with a minimum of manual labor.

With the above and other objects in view, the present invention consists in the improved construction, combination and relative arrangement of the several parts, as will be hereinafter more fully explained and subsequently incorporated in the subjoined claims.

In the accompanying drawings wherein I have illustrated one practical embodiment of my invention, and wherein similar reference characters designate corresponding parts throughout the several views:

Fig. 2 is a side elevation;

Fig. 3 is an enlarged plan view of one of the drill carriages, its supporting rail and the mount therefor;

Fig. 4 is a sectional view taken on the line 4—4 of Fig. 3.

Fig. 5 is a vertical section illustrating the adjustable mounting of the turret and the oscillatable carriage supporting rail;

Fig. 6 is a section taken on the line 6—6 of Fig. 5;

Fig. 7 is a detail elevation of the index means and the operating gearing for the drill;

Fig. 8 is a sectional view of the means for locking the drill against independent rotation;

Fig. 9 is a detail elevation of the drill supporting rest.

Figs. 10 and 11 are longitudinal and transverse sectional views respectively illustrating an alternative mounting and adjusting means for the drill carriage.

Figure 1:
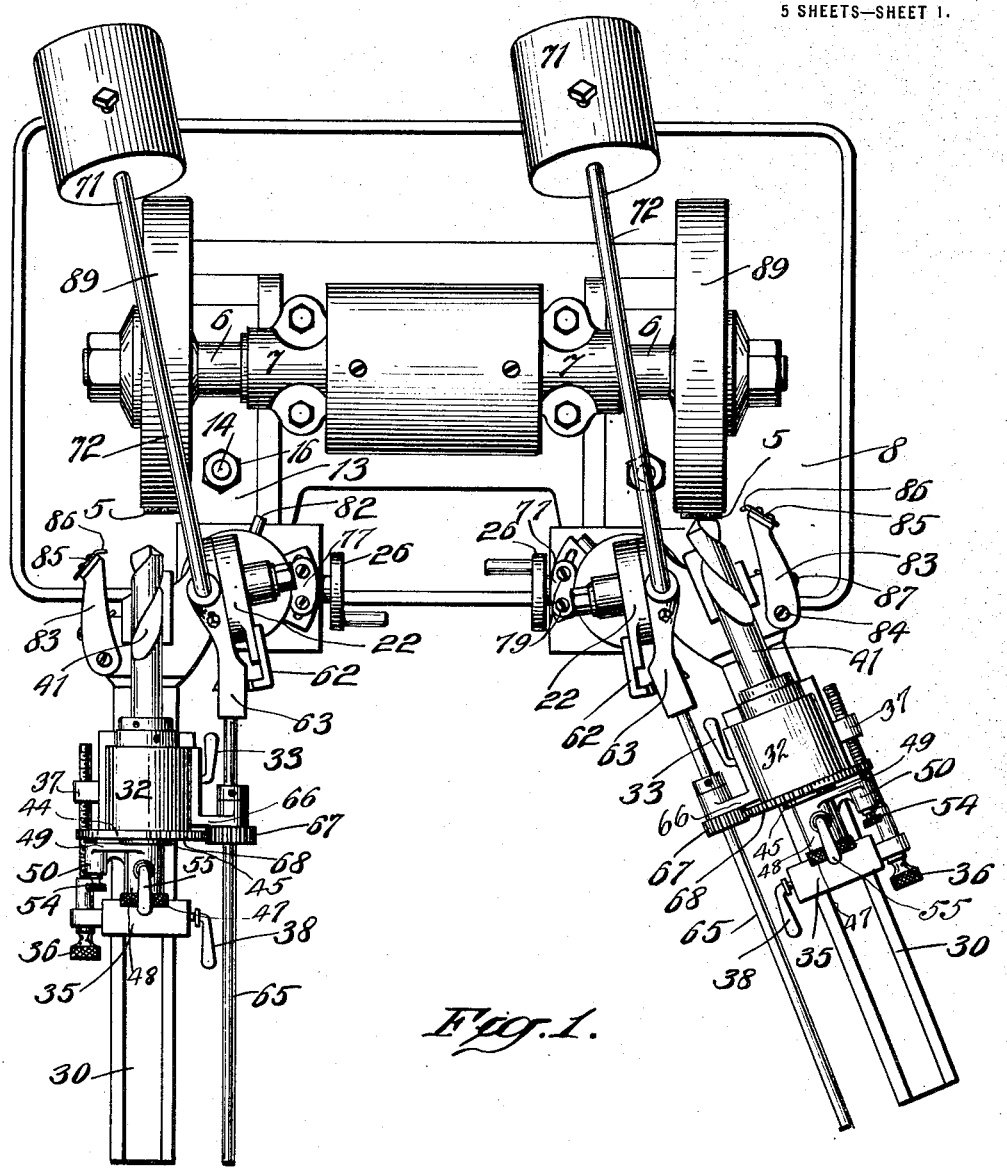
Figure 1 is a plan view of a twin type of drill grinder adapted for the grinding of right and left-hand drills.

In the illustrated embodiment of my invention the grinding wheels 5 of emery, carborundum or other suitable abrasive material are fixed upon the ends of a shaft 6 which is mounted in suitable bearing supports 7 fixed to the bedplate 8. This bedplate constitutes the top of a casing 9 within which the operating motor (not shown) is housed. A suitable bandwheel indicated at 10 is fixed upon the shaft 6 and is engaged by the driving band or belt 11 extending upwardly from the motor through suitable openings in the bedplate 8. Any conventional means may be employed for the purpose of obtaining two or more driving speeds for the shaft 6.

The bedplate 8 has parallel, transversely extending flanges 12 formed upon its upper surface. It will be understood that these flanges are provided at each end of the bedplate and the construction, mounting and arrangement of the oscillatable and adjustable drill carriage and its supporting rail for both the right and left hand drills is identical. Therefore, the following description of one of the drill supporting and adjusting means will suffice for both.

Upon the bedplate and between the flanges 12 a transversely adjustable slide 13 is mounted. A bolt 14 is fixed in this slide and extends downwardly through a slot 15 in the bedplate. By means of the clamping nut 16 on the upper end of said bolt the slide may be securely held in its adjustable position.

Upon the forward end of the slide 13 and upon the upper side thereof, a dovetail rib 17 is formed, said rib extending at right angles to the slide or in a direction parallel with the axis of the shaft 6. This rib is formed with a longitudinal channel or cavity 18 which is closed at one of its ends by the upwardly projecting lug or wall 19.

A base plate 20 is formed with a dovetail channel or groove 21 to receive the rib 17 and upon this plate 20 the turret 22 is rotatably mounted and held in assembled relation thereon by means of the bolt 23. The plate 20 is formed with a depending ear or lug 24 having a threaded opening to receive the adjusting screw 25 which is mounted in the end wall 19 of the rib 17 as clearly shown in Fig. 5 of the drawings. One end of the screw is provided with a suitable hand crank 26 by means of which the screw may be conveniently rotated to thereby move the plate 20 relative to the slide 13. A shim plate 27 is introduced between one of the side flanges of the rib 17 and the opposed inclined wall of the dovetail groove 21. A lever setscrew 28 is adapted for engagement with this plate whereby the base 20 may be securely fixed in its adjusted position upon the end of the slide 13.

In the upper end of the turret 22 a shaft 29 is rotatably mounted, and to one end of this shaft the laterally offset, vertically disposed end portion 31 of a rail 30 is suitably fixed. This rail is of dovetail form in cross section and upon the same the drill carriage 32 is mounted for longitudinal sliding movement. This carriage is provided with a lever setscrew 33 to engage the shim plate 34 whereby the carriage may be securely fixed in its adjusted position on the rail. A transverse bar 35 is also slidably mounted on the rail 30 and in one end of this bar the adjusting screw 36 is rotatably engaged. This screw is threaded in a lug 37 which projects from one side of the carriage 32. The bar 35 is adapted to be secured in an adjusted position on the rail 30 by means of the lever setscrew 38. It will thus be apparent that by turning the screw 36 the carriage 32 may be moved in either direction upon the supporting rail 30.

In the carriage 32 a sleeve 39 is rotatably mounted, and within this sleeve the drill receiving socket member 40 is engaged and is frictionally held for rotation therewith, but is capable of an independent manual rotation as will be presently explained. The tapered shank of the drill indicated at 41 is adapted to be tightly fitted within the socket member 40. It will be understood, however, that if a straight shank drill is to be ground, a suitable chuck will be substituted for the member 40. Upon the corresponding ends of the sleeve 39 and the socket member 40 suitable stop collars 42 and 43 respectively are fixed. The other end of the sleeve 39 is provided for a large interrupted gear 44 and the member 40 is formed with a flange 45 which engages the outer face of this gear. From this flange the member 40 is reduced in diameter and longitudinally extended as at 46. Upon the end of such extension a knurled collar 47 is secured. Between this collar and the flange 45 a sleeve 48 is loosely engaged on the reduced end 46 of the socket member. This sleeve is provided with a radially projecting arm 49 which terminates in an elongated socket 50. A locking pin 51 is mounted in this socket and is adapted to be engaged in any one of a plurality of openings 52 formed in the gear 44. The pin 51 is provided with a reduced section extending through the socket 50 around which an expansion spring 53 is engaged, said spring normally acting to project the pin 51 from the open end of the socket. The reduced end of the pin is provided with a knurled head or finger piece 54 whereby the pin may be readily withdrawn from the opening 52 to release the socket member 40 from its locked connection with the gear 44. In the sleeve 48 a lever setscrew 55 is threaded and is adapted to engage with the wall of a circumferential groove 56 formed in the periphery of the reduced end 46 of the socket member. By releasing this setscrew it will be understood that the member 40 can then be rotated relative to the sleeve 48 and the cutting lip of the drill 41 properly positioned with respect to the peripheral grinding face of the wheel 5.

The pin 51 coöperating with the openings in the gear 44 provides an index means so that the cutting lips of a multiple lip drill may be successively disposed in the proper position to be sharpened or ground. It will, therefore, be understood that the openings 52 in the gear are accurately spaced. The machine may be provided with interchangeable sleeves 40 having gears 44 provided with different numbers of the opening 52 to be used in connection with drills having different numbers of cutting lips.

Upon the end of the rail 30 which is next adjacent to the emery wheel 5, an obliquely inclined guide 57 is formed through which the rectangular shank 59 of the drill or tool rest 58 is movably disposed. As seen in Fig. 9 of the drawings this tool rest is of V-shaped form and is provided with flaring or diverging flanges 60 upon which the drill rests and is supported in a horizontal position. The rest 58 is urged upwardly into engagement with the drill by means of a leaf spring 60 which is fixed at one of its ends to the underside of the rail 30 while the free end of said spring bears upwardly against the lower end of the shank 59. A lever screw 61 is threaded in one side of the guide 57 to engage the shank 59 and hold the rest 58 in a depressed or lowered position while the drill is being mounted in the carriage.

Upon the upper end of the turret 22 at one side thereof, a laterally projecting arcuate flange is formed and to this flange a gear segment or rack 62 is securely fixed. The vertically disposed, laterally offset end of rail 30 is formed with an arm 63 which is bifurcated to accommodate the pinion 64 fixed upon the end of the shaft 65 which is suitably journaled in said bifurcated arm. This shaft also is mounted in a bracket 66 which is fixed to the carriage 32. A pinion 67 is engaged upon shaft 65 at one side of said bracket and meshes with the teeth 68 of the interrupted gear 44. The shaft 65 is formed with a longitudinally extending keyway 69 to receive the key 70 on the pinion 67. Thus it will be apparent that in the adjustment of the carriage 32 upon the rail 30, the gear 44 and the pinion 67 remain in mesh, said pinion sliding freely on the shaft 65 but remaining locked therewith so that the pinion will at all times rotate with said shaft.

A counterbalancing weight 71 is fixed to one end of a curved rod 72, the other end of which is secured in a socket 73 formed upon the vertical portion 31 of the rail 30 by means of the setscrew 74. This counterbalancing weight normally holds the rail 30 and the parts carried thereby in a horizontal position and against oscillatory movement relative to the supporting turret 22. Such oscillating movement of the rail is limited by the stud 75 carried by the part 31 and projecting into an arcuate recess 76 formed in the face of the turret head in concentric relation with the axis of the pivot shaft 29.

Upon the upper surface of the base plate 20 a bar 77 is mounted having a slot 78 therein extending in concentric relation to the pivot bolt 23 connecting the turret to the base plate 20. This slot receives the screws 79 which are threaded in the plate 20, said screws having heads upon their upper ends to engage a clamping plate 80 whereby the bar 77 may be securely clamped in its adjusted position. This bar is adapted for adjustment relative to a graduated scale indicated at 81 which is provided upon the lower end of the turret 22. In the turret a stop pin 82 is fixed and projects radially from the periphery thereof for contact with one end of the bar 77. Thus it will be seen that the rotative movement of the turret will be positively limited so that the edge of the drill may be cut or ground to a desired predetermined angle.

For the purpose of accurately positioning the cutting lips of the drill relative to the grinding face of the wheel I have provided a suitable gage. This gage comprises an arm 83 which is pivotally mounted at one of its ends by means of a screw 84 upon the end of the rail 30 adjacent the rest 58. To the free end of the arm 83 an upwardly extending plate 85 is fixed, said plate being formed with an angularly disposed finger 86. This gage is normally held in an inoperative position by means of a leaf spring 87, one end of which is suitably secured to the arm 83 while the other free end thereof exerts a resilient pressure against the end of the rail 30 and normally urges the free end of arm 83 outwardly away from the drill point. In positioning the drill the arm 83 is forced inwardly so as to position the finger 86 in line with the drill center. The screw 36 is then adjusted to move the carriage and the drill upon the supporting rail 30 until the center of the drill point comes into contact with the finger 86. Upon the release of the arm 83 it is immediately moved outwardly to its normal position by the spring 87 so that it will not in any manner interfere with the proper grinding of the drill.

The slide member 13 is provided with an upwardly extending standard 88 which supports a wheel guard 89. This guard, as shown in Fig. 4, is open upon one side and extends around the wheel 5 in concentric relation thereto. The annular wall of the wheel guard as well as the side wall thereof is slotted or cut away as at 90 so as to permit the drill point to engage the peripheral grinding face of the wheel in the oscillatory movement of the carriage supporting rail 30. By mounting the guard upon the slide member 13, it will be seen that as the grinding face of the wheel is worn down and it becomes necessary to shift the slide 13, the annular wall of the guard at the upper and lower sides at the opening 90 will still be maintained in the same position relative to the grinding face of the wheel, and will not interfere or contact with the drill in the oscillatory movement of the supporting rail.

From the foregoing description considered in connection with the accompanying drawings, the construction, manner of operation and several advantages of my invention, will be clearly and fully understood. The pivot shaft 29 for the rail 30 is accurately positioned relative to the central line of the drill carriage so that the center point of the drill will be accurately disposed in the precise axial center of the drill body when the grinding operation has been completed. As the rail 30 is oscillated and moved downwardly from its normal horizontal position an oscillatory rotary movement is simultaneously imparted to the drill through the medium of the shaft 65 and the gearing above referred to. Owing to this combined bodily oscillation and rotary movement of the drill about its own axis, the drill lip will be provided with a rounded clearance face as it moves over the grinding surface of the wheel. This operation takes place in the oscillating movement of the supporting rail in each direction, and a very few movements of the rail will result in an accurate and satisfactory grinding or sharpening of the drill lip. It is to be noted that the grinding action of the abrasive material on the lip of the drill takes place in line with the grain of the metal so that the cutting edge will be perfectly smooth and sharp, and an irregular or "wire" cutting edge which is quickly dulled is obviated. The grinding of the drill is thus practically automatic and requires very little exertion on the part of the operator or attendant. After one drill lip has been ground the index pin is withdrawn and the socket member 40 rotated within the sleeve 39 until the pin is disposed in line with the next adjacent opening 52 in the gear 44. Upon the release of the pin the socket member is again securely locked for rotation with the sleeve 39 and the next lip may be ground or sharpened. The angle to which the cutting edge of the lip is ground may be readily changed as desired by a very simple adjustment of the bar 77 with respect to the scale 81. As the grinding face of the wheel becomes worn in one place, the base plate 20 may be easily shifted and adjusted upon the slide 13 so that the grinding action upon the drill point will occur at a different place on the wheel face. When it becomes necessary to true the face of the grinding wheel, a diamond may be substituted for the drill and operated across the peripheral face of the wheel by shifting the base plate 20 upon the guide 13. In this manner the wheel may be quickly and accurately trued without undue waste.

In Figs. 10 and 11 of the drawings I have illustrated a slightly modified construction in which the rail or support 30' is of cylindrical tubular form. A rod 91 extends through the carriage support and is suitably fixed at its forward end to the support. The rear end of this rod, which projects beyond the rear open end of the supporting rail, is threaded to receive a suitable handle member 92 which is provided with a flange 93 to engage against the end of the rail 30'. A flanged cap 94 is fitted upon the end of the rail and secured by means of the screw 95 thereto. The flange of this cap is engaged upon the outer face of the flange 93.

The carriage 32' in this form of my invention is provided with a longitudinal split sleeve 96 which surrounds the tubular rail 30'. This split sleeve below the rail is formed with the depending flanges 97 which are connected at their ends by the screws 98. A vertically disposed screw 99 extends between these flanges and has threaded engagement therewith. The upper end of this screw is adapted to bind against the flat longitudinally extending face 100 formed on the under side of the rod 91, the said screw being provided at its lower end with a suitable handle 101 whereby it may be conveniently adjusted. The screws 98 are loosely disposed through one of the flanges 97 and have a threaded engagement in the opposed flange. A central transverse screw 102 is loosely mounted in the latter flange of the split sleeve and has threaded engagement in the first named flange. This screw is shouldered, as shown at 103, for bearing engagement with an opposing shoulder on the flange 97 in which the said screw is loosely mounted.

To one end of the screw a suitable handle 104 is fixed and it will be apparent that by rotating the said screw in the proper direction, the flanges may be drawn together and the sleeve contracted into tight binding engagement upon the tubular rail 30'. At the same time, the threaded portions of the flanges 97 with which the screw 99 is engaged are caused to tightly bind upon said screw and thereby hold the latter against casual movement. In this manner, the carriage may be easily and quickly securely locked in its longitudinally adjusted position upon the support.

It will be noted that the longitudinal axis of the carriage 32' is laterally offset and disposed out of the vertical plane of the longitudinal axis of the rail 30'. In this construction the socket member 40', which is mounted in the carriage to receive the tool, is formed with a reduced extension 46' as in the construction above described, and upon said extension the sleeve 48' is rotatably engaged, said sleeve extending between the nut 47' threaded upon the sleeve extension and the interrupted gear 44' which is suitably secured to the socket member. The sleeve 48' carries the index pin 51' for engagement with the spaced openings provided in the gear 44'. This index means is substantially the same as that before described and operates in a similar manner to position the drill lips for engagement with the face of the grinding wheel. The sleeve 48′ may be locked to the socket member for rotation therewith by means of the said screw 55′.

The body of the carriage 32′ is formed with a guard flange 105 which extends around the interrupted gear 44′ and has a laterally disposed portion 106 to extend around the pinion which is fixed upon the shaft 65′ and meshes with said interrupted gear.

It will be seen from the above that the modified mounting of the drill carriage upon the supporting rail, is greatly simplified, and in practice this construction will preferably be employed as it also admits of a quicker and more accurate adjustment of the drill.

I have found in practice that a machine embodying the several improvements as above described results in material economy as it obviates breakage of the drills by accurate grinding, the elimination of eccentric center points and also the possible breaking of bushings and other parts on the drill presses will be minimized. It is to be understood that if desired instead of building the machine in twin form, separate machines for grinding right and left hand drills may be provided.

While I have herein illustrated and described what I have found to be a very satisfactory practical embodiment of the invention, it is to be understood that the machine may also be exemplified in numerous alternative constructions and I accordingly reserve the privilege of adapting all such legitimate changes in the combination and relative arrangements of the several parts above referred to, as may be fairly embodied within the spirit and scope of the invention as claimed.

I claim:

1. In a twist drill grinder, a pivoted non-rotatable support normally sustained by gravity in a horizontal position, and adapted to be manually oscillated in a vertical plane, means for rotatably mounting a drill upon said support, and holding the same against axial displacement, and means for imparting an oscillatory rotation to the drill during the vertical oscillation of said support.

2. In a twist drill grinder, a drill support pivotally mounted for vertical oscillatory movement, counterbalancing means connected to said support to normally retain same in a horiontal position, means for rotatably mounting a drill upon said support, and means for imparting an oscillatory rotation to the drill during the vertical oscillation of said support.

3. In a twist drill grinder, a turret, a support oscillatably mounted on said turret for movement in a vertical plane relative to the grinding wheel, a carriage adjustable upon the support, a drill holder rotatably mounted in said carriage with respect to the turret, means for adjusting said carriage to position the drill point relative to the grinding surface, and means for imparting an oscillatory rotation to the drill holder about its own axis with relation to the carriage during the vertical oscillation of said support.

4. In a twist drill grinder, a turret, a counterbalanced support pivotally mounted at one of its ends upon said turret for vertical oscillatory movement, a carriage longitudinally adjustable upon the support, a drill holder rotatably mounted in said carriage to position the drill point relative to the grinding surface, and means for imparting an oscillatory rotation to the drill holder during the vertical oscillation of said support.

5. In a twist drill grinder, a counterbalanced support pivotally mounted for vertical oscillatory movement, a drill carriage on said support and having means for rotatably mounting a drill therein, means for adjusting the carriage upon the support to position the drill point relative to the grinding surface, and means for imparting an oscillatory rotation to the drill with respect to said carriage during the vertical oscillation of the support.

6. In a twist drill grinder, a turret mounted to turn about a vertical axis, a drill support mounted upon the turret for oscillatory movement in a vertical plane, counterbalancing means acting to normally maintain the support in a horizontal plane relative to the turret, means carried by said support to position a drill relative to the grinding wheel, adjustable means to limit the rotation of said turret whereby the edge of the drill lip may be ground to a desired angle, and means for imparting an oscillatory rotation to the drill during the vertical oscillation of the support.

7. In a twist drill grinder, a turret mounted to turn about a vertical axis, a drill support mounted upon the turret for oscillatory movement in a vertical plane, means carried by said support to position a drill relative to the grinding wheel, said turret having a scale, a stop carried by the turret, a member adjustable with relation to the scale and adapted for engagement by said stop to limit the rotation of the turret and thereby determine the angle to which the edge of the drill lip is ground, and means for automatically roating the drill during the oscillatory movement of the support.

8. In a twist drill grinder, in combination with a bedplate and a grinding wheel mounted thereon, a slide adjustable upon the bedplate in a line at right angles to the axis of the wheel, drill supporting means on said slide, means for adjusting said drill supporting means with relation to the slide and in a line parallel to the axis of the wheel, and a guard for the wheel carried by and movable with the slide.

9. In a twist drill grinder, in combination with a bedplate and a grinding wheel mounted thereon, a slide adjustable upon the bedplate in a line at right angles to the axis of the wheel, a turret on said slide, means for adjusting the turret in a line parallel to the axis of the wheel, a drill support mounted on the turret, and a guard for the wheel carried by and movable with the slide.

10. In a twist drill grinder, in combination with a bedplate and a grinding wheel mounted thereon, a slide adjustable upon the bedplate in a line at right angles to the axis of the wheel, a turret on said slide, means for adjusting the turret in a line parallel to the axis of the wheel, a drill support mounted on the turret, and a guard for the wheel bearing a fixed relation to the drill support and movable in the adjustment of said slide with respect to the grinding wheel.

11. In a twist drill grinder, a drill support mounted to oscillate in a vertical plane relative to the wheel, a rest for the drill mounted in the support, means acting to yieldingly urge the rest into engagement with the drill to position the drill in parallel relation to the support.

12. In a twist drill grinder, a drill support mounted to oscillate in a vertical plane relative to the wheel, a rest for the drill, means acting to yieldingly urge the rest into engagement with the drill to position the drill in parallel relation to the support, and means for locking the rest in an inoperative position.

13. In a twist drill grinder, a drill support mounted to oscillate in a vertical plane relative to the grinding wheel, a rest for the drill mounted in the support, said rest having a shank extending through the support, and a leaf spring fixed at one of its ends to the support and engaged at its other end with said shank to yieldingly urge the rest to its effective position in engagement with the drill.

14. In a twist drill grinder, a vertically oscillatable support, a drill holder rotatably mounted upon said support, means for manually rotating said holder to adjust the drill lips relative to the grinding surface, and additional means for automatically rotating the drill holder independently of said manual means during the vertical oscillation of the support.

15. In a twist drill grinder, a support, a drill carriage mounted on said support, means for adjusting the carriage, a gage pivotally mounted on the support and adapted to be positioned for contact with the drill point to determine the position of the drill point relative to the grinding surface, and a spring normally holding the gage out of the path of the movement of the drill.

16. In a twist drill grinder, a support, a carriage on said support, means for mounting a drill in said carriage, index means for rotating the drill and locking the same relative to the carriage to successively dispose the lips of the drill in position for grinding, and means for shifting the carriage upon said support toward or from the grinding member.

17. In a twist drill grinder, a support, a carriage on said support, a sleeve mounted in said carriage and having a flange on one end, a socket member rotatable in said sleeve and adapted to receive the drill shank, said member adapted to be rotated in the sleeve to successively dispose the drill lips in position to be ground, means carried by the sleeve and coacting with said flange to lock the drill in its adjusted position, and means for shifting the carriage upon said support toward or from the grinding member.

18. In a twist drill grinder, a support, a carriage on said support, a sleeve mounted in said carriage and having a flange on one end, a socket member rotatable in said sleeve and adapted to receive the drill shank, said member adapted to be rotated in the sleeve to successively dispose the drill lips in position to be ground, an arm loosely engaged on the sleeve, means for releasably clamping the arm to the sleeve for movement therewith, an index pin carried by the arm and coacting with said flange to lock the drill in its adjusted position, and means for shifting the carriage upon said support toward or from the grinding member.

19. In a twist drill grinder, a turret pivotally movable about a vertical axis, a support mounted upon said turret for oscillatory movement about a horizontal axis, a drill carriage mounted on said support and having means for rotatably mounting a drill therein, means for adjusting the carriage on the support to position the drill point relative to the grinding surface, adjustable means for limiting the pivotal movement of the turret to thereby grind the drill lip to a predetermined angle, and means for imparting an oscillatory rotation to the drill during the vertical oscillation of said support.

20. In a twist drill grinder, a support, a carriage on said support, means for mounting a drill in said carriage, index means for rotating the drill and locking the same relative to the carriage to successively dispose the lips of the drill in position for grinding, said carriage having a base part longitudinally shiftable upon the support, and means for rigidly clamping the carriage in an adjusted position upon the support relative to the grinding member.

21. In a twist drill grinder, a drill support oscillatably mounted for movement in a vertical plane, a carriage movable on the support toward and from the grinding face of a wheel, index means having a part for rotating the drill on the carriage to successively position the drill lips to be ground, and means for automatically imparting an oscillatory rotation to the drill independently of said index means during the oscillatory movement of the support.

In testimony that I claim the foregoing as my invention, I have signed my name hereunder.

JULIUS C. HINZ.